(12) United States Patent
Reed et al.

(10) Patent No.: US 8,639,900 B2
(45) Date of Patent: *Jan. 28, 2014

(54) DEFRAGMENTATION OF DATA STORAGE POOLS

(75) Inventors: David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 287 days.

This patent is subject to a terminal disclaimer.

(21) Appl. No.: 13/115,805

(22) Filed: May 25, 2011

(65) Prior Publication Data

US 2012/0303916 A1 Nov. 29, 2012

(51) Int. Cl.
*G06F 12/00* (2006.01)
(52) U.S. Cl.
USPC .......................... 711/165; 707/693
(58) Field of Classification Search
USPC .......................... 711/165; 707/693
See application file for complete search history.

(56) References Cited

U.S. PATENT DOCUMENTS

| | | | |
|---|---|---|---|
| 7,409,527 B2 * | 8/2008 | Hu | 711/219 |
| 7,536,505 B2 * | 5/2009 | Takakuwa | 711/114 |
| 7,788,460 B2 * | 8/2010 | Rothman et al. | 711/170 |
| 8,037,239 B2 * | 10/2011 | Furuhashi | 711/112 |
| 8,086,810 B2 * | 12/2011 | Huber et al. | 711/165 |
| 8,086,819 B2 | 12/2011 | Thomas et al. | |
| 2007/0113036 A1 | 5/2007 | Gal-Oz | |
| 2007/0168634 A1 * | 7/2007 | Morishita et al. | 711/170 |
| 2007/0226445 A1 | 9/2007 | Nichols et al. | |
| 2008/0184000 A1 | 7/2008 | Kawaguchi | |
| 2010/0180093 A1 | 7/2010 | Huber et al. | |
| 2010/0293354 A1 * | 11/2010 | Perez et al. | 711/171 |
| 2011/0072230 A1 * | 3/2011 | Dudgeon et al. | 711/165 |
| 2011/0179219 A1 * | 7/2011 | Ma et al. | 711/103 |

* cited by examiner

*Primary Examiner* — Hashem Farrokh
*Assistant Examiner* — Mohammed Haque
(74) *Attorney, Agent, or Firm* — John H. Holcombe

(57) ABSTRACT

In a computer-implemented data storage system comprising at least one storage control and data storage, wherein data is stored in the form of volumes, at least a plurality of volumes having at least some freespace, and a grouping of a plurality of volumes comprises a pool. In response to a defragmentation request, the storage control initiates migration of data from a pool to generate additional freespace. Subsequent to the migration of data, fragmentation of data of the pool is computed, and the amount of existing freespace of the pool is determined. The amount of existing freespace is compared to a freespace threshold, where the freespace threshold is related to the computed fragmentation. If the comparison indicates the amount of freespace is below the threshold, spill volumes are added to the pool; and, else, the pool is kept intact without adding spill volumes. Then, defragmentation of the pool is initiated.

17 Claims, 4 Drawing Sheets

| 401 | 402 | 403 | 404 | 405 | 406 | 407 | |
|---|---|---|---|---|---|---|---|
| 1000 | 500 | 1000 | 500 | Empty | 1000 | 500 | Extents |
| 100 | 100 | 100 | 100 |  | 100 | 100 | Data Sets |
| 10K | 10K | 10K | 10K | 10K | 10K | 10K | Capacity |

FIG. 4

| 501 | 502 | 503 | 504 | 505 | 506 | 507 | |
|---|---|---|---|---|---|---|---|
| 200 | 100 | 200 | Empty | 100 | 200 | 100 | Extents |
| 50 | 25 | 50 |  | 50 | 50 | 25 | Data Sets |
| 10K | 10K | 10K | 10K | 10K | 10K | 10K | Capacity |

DEFRAGMENTATION OF DATA STORAGE POOLS

FIELD OF THE INVENTION

This invention relates to computer-implemented data storage, and more particularly to defragmentation of data with respect to such data storage.

BACKGROUND OF THE INVENTION

Updating data storage on serial devices of a data storage system, two examples of which are disk storage and RAID (Redundant Array of Independent Disks) systems, typically results in a phenomenon known as fragmentation to occur. For example, when a file, such as a data set, is first created, the computer-implemented system will cause the file to be allocated to a contiguous area, such as a series of tracks or cylinders on the disk or RAID system, if it is possible to get the contiguous area. However, when the user adds data or updates data of a first file, some additional space at another physical location on the disk is allocated for the addition or update, and the outdated portion of the file may be deleted, resulting in fragmentation of the data both of the original file due to the deletion and of the added or updated data due to the placement of the data.

Fragmentation tends to build up over time as more data and files are added, deleted and modified. Hence, defragmentation algorithms have been developed to analyze the fragmented data and move data in such a way as to place portions of data in deleted areas to reorganize the data, making the data both more contiguous and in the proper sequence. A few of the numerous examples of defragmentation algorithms comprise "Real Time Defrag" of Dino Software, "Compaktor" of Computer Associates, and "DFDSS Defrag" of International Business Machines Corp.

Herein, the term "freespace" is used as a term of art to represent storage space whose data has been deleted, or added storage space without data, making the space "free" and available for use to store data.

SUMMARY OF THE INVENTION

Data storage systems and computer program products are provided to respond to requests for defragmentation of data of a data storage system.

In one embodiment, in a computer-implemented data storage system comprising at least one storage control and data storage, wherein data is stored in the form of volumes, at least a plurality of volumes having at least some freespace, and a grouping of a plurality of volumes comprises a pool, the following is performed:

initiating migration of data from a pool to generate additional freespace;

subsequent to the migration of data, computing fragmentation of data of the pool;

determining the amount of existing freespace of the pool;

comparing the amount of existing freespace to a freespace threshold, the freespace threshold related to the computed fragmentation;

if the comparison indicates the amount of freespace is below the threshold, adding spill volumes to the pool; and else, keeping the pool intact without adding spill volumes; and initiating defragmentation of the pool.

In another embodiment, additionally identifying the spill volumes, if any, as temporary volumes, and, subsequent to the defragmentation of the pool, removing the spill volumes from the pool.

In still another embodiment, wherein the freespace threshold comprises a nominal threshold, the computed fragmentation adjusts the freespace threshold to either increase or decrease the freespace threshold.

In a further embodiment, the adjustment comprises a range of values.

In a still further embodiment, the range of values is adjusted between the values in relation to an index of the computed fragmentation.

In another embodiment, the freespace threshold (T) is determined in accordance with a formula:

$$(T) = (\text{total storage capacity of the pool}) \times (\text{nominal threshold}) \times \{\text{range of 0.5 to 1.5}\}$$

where the value within the range is based on an index of the computed fragmentation.

In a further embodiment, the index of the computed fragmentation is a value from 0 to 1.0 added to the bottom of the range.

In a still further embodiment, the computed fragmentation is a ratio of an estimated number of fragments to the data storage capacity of the pool.

In a further embodiment, the data comprises volumes having a plurality of data sets, the data sets having at least one data extent each, and wherein the estimated number of fragments is determined from the number of data extents of the pool less the number of data sets of the pool.

For a fuller understanding of the present invention, reference should be made to the following detailed description taken in conjunction with the accompanying drawings.

BRIEF DESCRIPTION OF THE DRAWINGS

FIG. 4 is a diagrammatic illustration of data volumes of the system of FIGS. 1 and 2; and FIG. 5 is another diagrammatic illustration of data volumes of the system of FIGS. 1 and 2.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
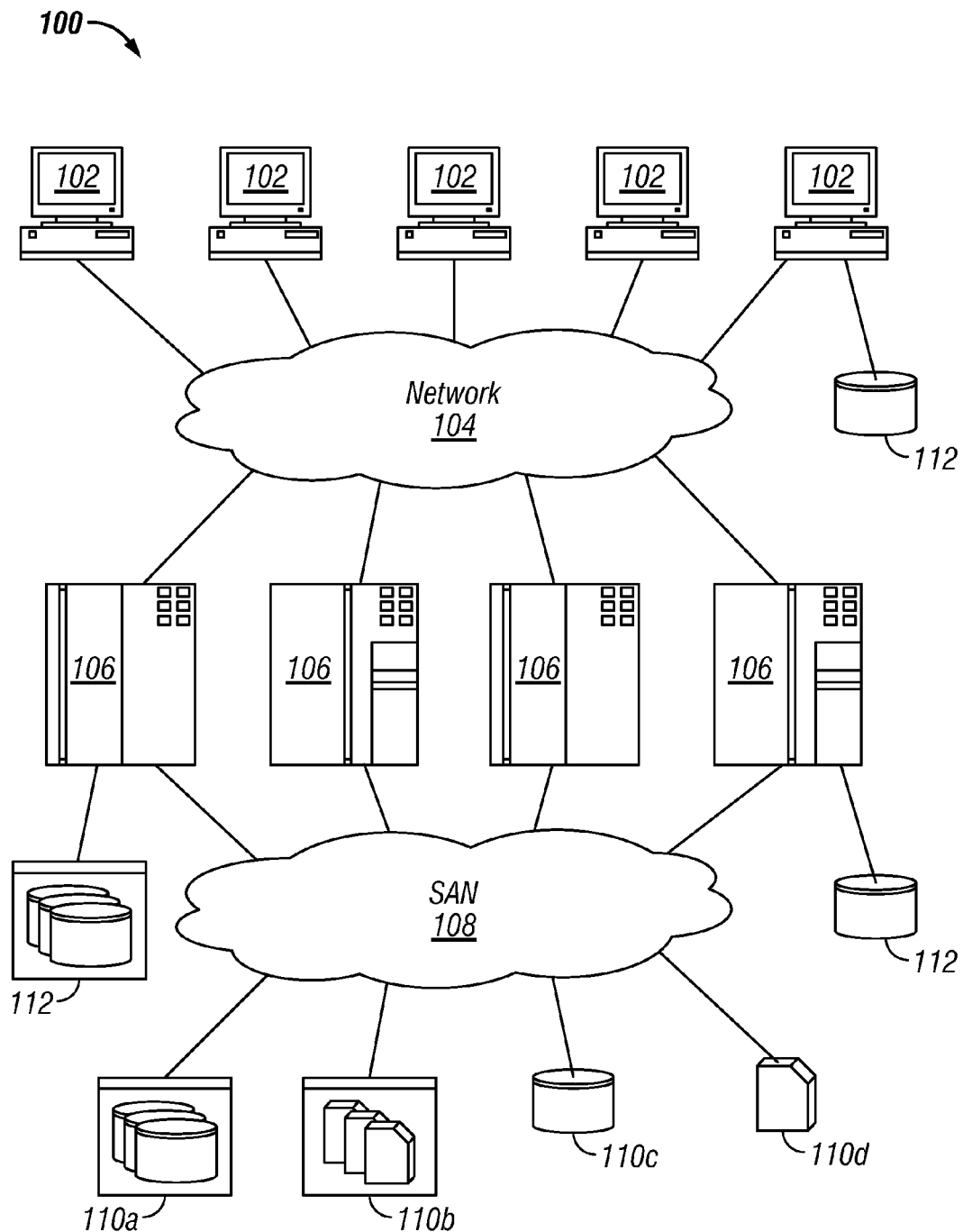
FIG. 1 is a high-level block diagram showing one embodiment of a computer-implemented system made up of different types of computing and data storage devices.

Referring to FIG. 1, an example of a computer-implemented system 100 is illustrated. The system is one of many computer-implemented systems which may implement the present invention to provide point-in-time copies of data during defragmentation of at least one of the data storage devices in the system. The system architecture 100 is presented to show various types of computing devices that may benefit from the apparatus and methods disclosed herein. The system architecture 100 is presented only by way of example and is not intended to be limiting. Indeed, the apparatus and methods disclosed herein may be applicable to a wide variety of different computing devices and is not limited to those illustrated herein.

As shown, the exemplary system architecture 100 includes one or more computer processors 102, 106 interconnected by a network 104. The network 104 may include, for example, a local-area-network (LAN), a wide-area-network (WAN), the Internet, an intranet, or the like. In certain embodiments, the computer processors 102, 106 may include both client computer processors 102 and server computer processors 106. In the example, the client computers 102 initiate communication sessions, whereas the server computer processors 106 wait for requests from the client computer processors 102. In certain embodiments, the computer processors 102 and/or server processors 106 may connect to one or more internal or external data storage systems 112 (e.g., hard-disk drives, solid-state drives, tape drives, libraries, etc.). These computer processors 102, 106 and direct-attached storage systems 112 may communicate using protocols such as ATA, SATA, SCSI, SAS, Fibre Channel, or the like.

The system architecture 100 may, in certain embodiments, include a storage network 108 behind the server processors 106, such as a storage-area-network (SAN) or a LAN (e.g., when using network-attached storage). This network 108 may connect the server processors 106 to one or more data storage systems 110, such as arrays 110a of hard-disk drives or solid-state drives, including RAID (Redundant Array of Independent Disks) arrays, tape libraries 110b, individual hard-disk drives 110c or solid-state drives 110c, tape drives or libraries 110d, CD-ROM libraries, virtual tape libraries, or the like. To access a storage system 110, a server processor 106 may communicate over physical connections from one or more ports on the server processor 106 to one or more ports on the storage system 110. A connection may be through a switch, fabric, direct connection, or the like. In certain embodiments, the server processors 106 and storage systems 110 may communicate using a networking standard such as Fibre Channel (FC).

Figure 2:
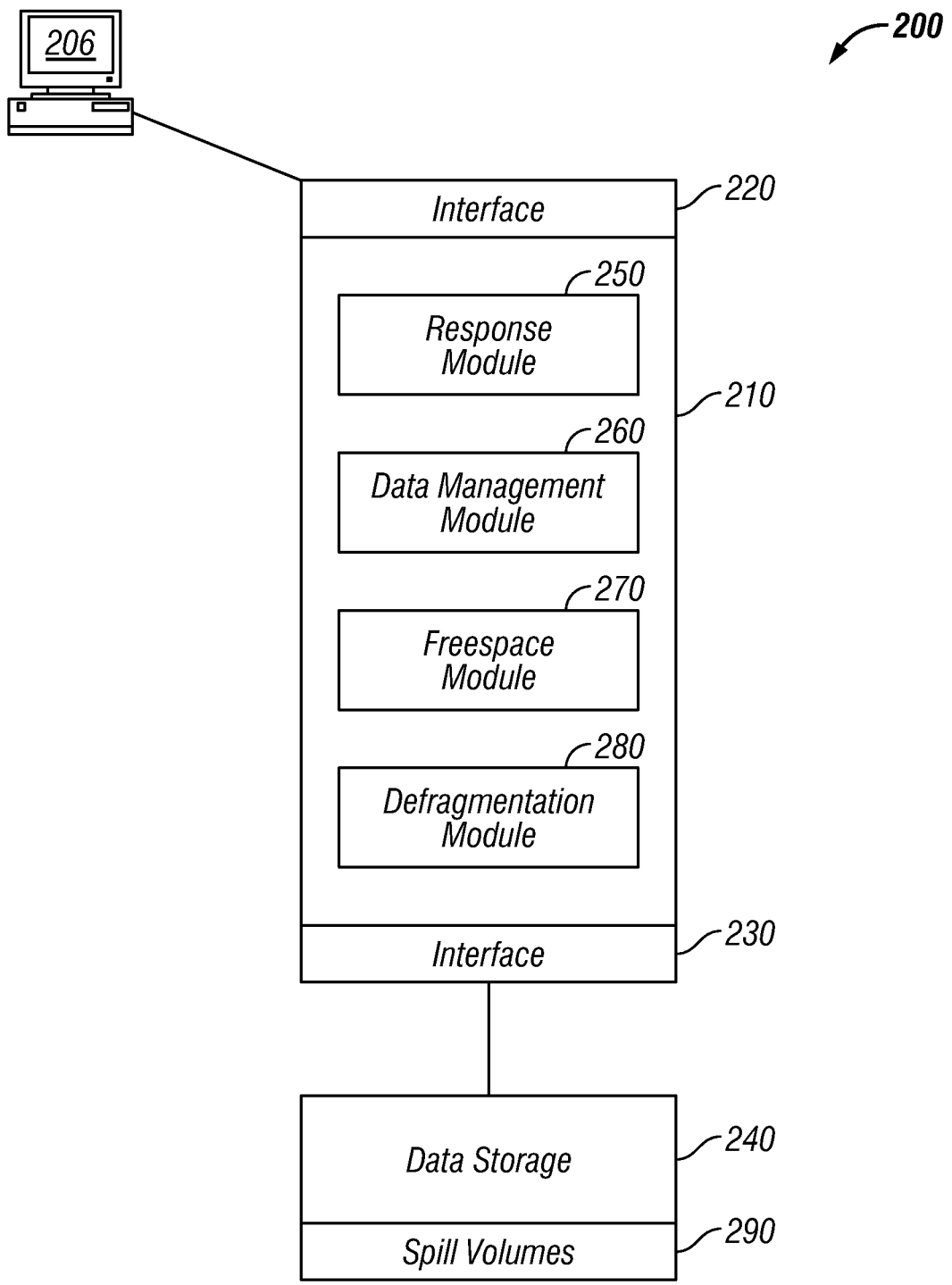
FIG. 2 is a high-level block diagram showing one embodiment of a computer-implemented system for providing defragmentation of at least one of the data storage devices of FIG. 1.

Referring to FIG. 2, one embodiment of a computer-implemented system 200 is illustrated for providing data handling to provide for defragmentation of at least one of the data storage devices of FIG. 1. The computer-implemented system 200 may be implemented in any of the devices or systems of FIG. 1, including a client system 102, a server processor 106, a storage system 110, and attached storage 112, or in another computer-implemented system connected via network 104. As shown, the computer-implemented system 200 comprises one or more modules to provide the data handling. The modules may be located at one or more computer processors and one or more associated computer-usable storage medium having non-transient computer-usable program code embodied therein. The details of the computer processors and computer-usable storage medium are discussed hereinafter. The computer-implemented system 200 may receive commands, information and the computer-usable program code, and provide commands, notifications and information to, one or more hosts or host terminals 206. These modules may be incorporated in or comprise applications of a storage control 210, comprising a stand alone unit or comprise a portion of the host, server processor, storage system or attached storage.

The modules may comprise a module 220 to interface with the host system and the defragmentation application and a module 230 to interface with the data storage 240 comprising a storage device or devices whose data is defragmented by the defragmentation application, and which comprises additional volumes that may have no active data.

Although illustrated as grouped together, the modules and other elements may be spread among various computer processors and systems, as discussed above.

In one embodiment, the data of data storage 240 comprises one or more pools of volumes having a plurality of data sets, the data sets having at least one data extent each.

Inter alia, the storage control 210 implements a response module 250 which responds to commands and requests information to and receives information from the host 206 via interface 220. A data management module 260 calls a data management process, such as the "HSM" of International Business Machines Corp., which moves data from one type of data storage to another. As one example, "HSM" finds data that has aged to meet a particular threshold, and moves it to a less active level of data storage, for example, from a RAID arrangement of hard-disk drives to a tape library.

Data management herein is conducted with respect to an entire pool of data.

A freespace module 270 determines the fragmentation of the pool of data, determines the amount of existing freespace in the pool, and conducts various actions with respect to the fragmentation and freespace.

A defragmentation module 280 initiates defragmentation, for example by calling a defragmentation process, such as "Real Time Defrag" of Dino Software, "Compaktor" of Computer Associates, and "DFDSS Defrag" of International Business Machines Corp. The defragmentation module may allow a user to select options regarding the defragmentation process for the pool. The user may select objects which are to be defragmented, and placement of some of the moved data objects in the pool, by the defragmentation process.

The data storage 240, as discussed above, may comprise one or more data storage pools, each with a plurality of volumes. The additional volumes that may have no active data, in one embodiment, comprise a number of "spill" volumes 290 that are volumes that contain no active data and belong to none of the pools.

As is known to those of skill in the art, computer-implemented data storage uses measurements and addressing that are based on past physical layouts of hard drive disk storage, such as "tracks" and "cylinders", but are smaller than the modern physical storage. To accommodate large amounts of data storage, addressing has been expanded in various ways. One example is implemented in the International Business Machines Corp. "z/OS" systems as "EAV" or Extendable Addressable Volumes which allowed storage volumes to be larger than 65,520 cylinders. In this environment, the space above the first 65,520 cylinders is referred to as "cylinder-managed space" and is extended addressing space. Data sets that are able to use cylinder-managed space are referred to as being eligible for extended addressing in any z/OS addressing scheme. An EAV volume has a region for smaller data sets known as a "track-managed" area, and a region of "chunk" managed storage which is allocated in 21 cylinder units for larger data sets.

A data set comprises one or more extents and a data set may be present in one volume or a plurality of volumes. Conversely, the volumes have a plurality of data sets, the data sets having at least one data extent. The capacity of a volume is typically measured by the number of cylinders, either allocated to the volume, or actually used by the volume.

Figure 3:
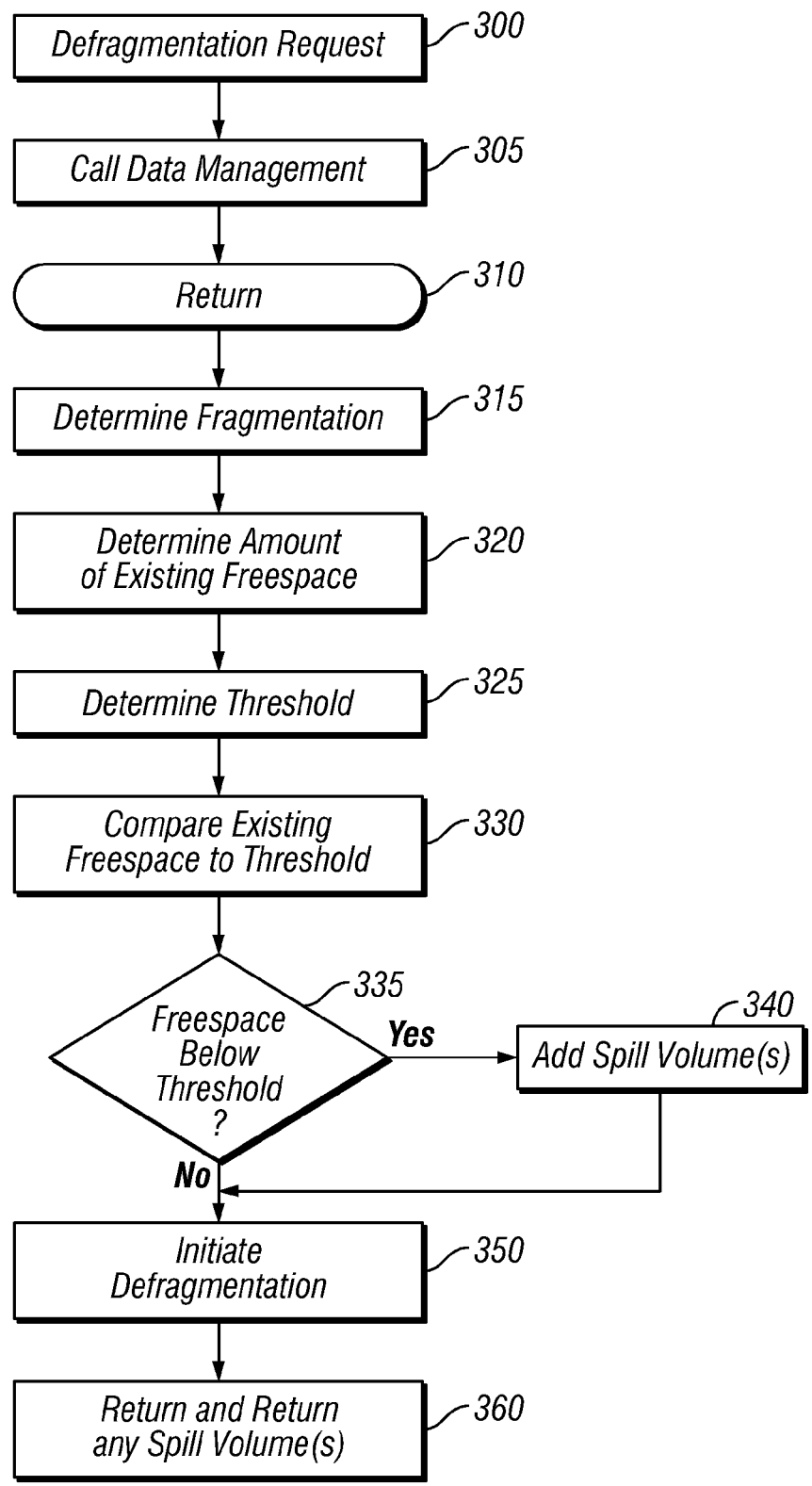
FIG. 3 is a flow chart depicting an exemplary method of operating the system of FIGS. 1 and 2.

Referring to FIGS. 2 and 3, the response module 250 responds to the initiation, for example, by a host system 206, of a defragmentation operation 300 with respect to a pool of volumes of data storage 240. As discussed above, defragmentation is an operation or process with respect to one level of data storage that takes data that has been fragmented over time and analyzes the fragmented data in such a way as to place portions of data in deleted areas to reorganize the data to make the data both more contiguous and in the proper sequence. The user 206 may specify the pool defragmentation command via a JCL batch job or via a TSO command. In the command, the user specifies the storage group name that comprises the pool that is to be defragmented. In step 300, the response module organizes the operations of the storage system to accommodate the defragmentation operation. This may comprise signaling the early completion or suspension of data storage operations.

In step 305, the data management module 260 calls a data management process, such as "HSM" discussed above, to finds data that has aged to meet a particular threshold, and moves it to a less active level of data storage 240, for example, from a RAID arrangement of hard-disk drives containing the pool of data to a tape library and out of the pool. The movement of data is typically conducted on a data set basis, and opens up freespace within the pool of data. Freespace is typically identified in the VTOC as deleted data.

Once the data management process is completed and the process returns in step 310 to the defragmentation operation, step 315 operates the freespace module 270 to measure and determine the fragmentation of the data of the pool to be defragmented.

Fragmentation is related to the complexity of the data after the data has been updated and changed over a period of time. Data may begin as data sets having a single extent, but over time as more data and files are added, deleted and modified, the data set becomes made up of additional extents that are physically dispersed.

One embodiment of step 315 to determine the fragmentation of a pool is by computing a ratio of an estimated number of fragments to the data storage capacity of the pool.

Where the data comprises volumes having a plurality of data sets, the data sets having at least one data extent each, the estimated number of fragments is determined from the number of data extents of the pool less the number of data sets of the pool.

The data storage capacity of the pool may be the number of cylinders comprising the pool.

In another embodiment, fragmentation is computed based on the extents on each volume, which is applicable to defragmentation of a volume. The fragmentation estimate is computed by computing the number of extents and the size of those extents. The number of extents divided by the average size of the extents gives a fragmentation measure for each volume. The fewer the number of extents and the larger the size of the extents, the smaller the fragmentation value is for a volume.

One embodiment of step 315 is to combine the volume fragmentation computations over the pool.

In step 320, the amount of existing freespace of the pool is determined.

Freespace is space in a volume that contains data that has been deleted or contains no data.

A tool to determine both the freespace and the fragmentation is "LSPACE" of International Business Machines Corp. LSPACE provides information on volume size, freespace on the volume, freespace of the VTOC and INDEX, fragmentation information such as number of extents and data sets, etc. Also provided is information in the size of the track-managed space and its freespace statistics. The LSPACE macro returns status information (such as LSPACE subfunction, return code, and reason code) in a parameter list. Options, such as "EXPMSG" and "XEXPMSG" create extended message return areas that the LSPACE macro needs to provide the freespace and volume space information on a volume basis. For volumes with cylinder-managed space, the freespace information is returned as freespace for the entire volume and freespace for the track-managed space. The two sets of freespace data will be the same for a volume that does not have cylinder-managed space. LSPACE also can return information such as the format, the data set control block, the total number of extents and free extents, or a fragmentation index.

Alternatively, a file allocation table (FAT) may provide beginning and ending cylinder ranges and includes freespace pointers which may be used to provide the freespace and space information on a volume basis to determine both the freespace and the fragmentation.

In step 325, the freespace module 270 determines the freespace threshold.

In one embodiment, the freespace threshold comprises a nominal threshold, and the computed fragmentation adjusts the freespace threshold to either increase or decrease the freespace threshold.

In a further embodiment, the adjustment comprises a range of values.

In a still further embodiment, the range of values is adjusted between the values in relation to an index of the computed fragmentation. In another embodiment, the freespace threshold (T) is determined in accordance with a formula:

$$(T) = (\text{total storage capacity of the pool}) \times (\text{nominal threshold}) \times \{\text{range of 0.5 to 1.5}\}$$

where the value within the range is based on the index of the computed fragmentation.

Thus, the index of the computed fragmentation is a value from 0 to 1.0 added to the bottom of the range.

Referring to FIGS. 4 and 5, two different layouts of data are illustrated.

For ease of presentation, the data is shown as representative virtual volumes of a pool without showing the physical dispersion of the data. A pool is actually likely to comprise hundreds or thousands of volumes.

The data of FIG. 4 illustrates an active type of data in which the representative volumes 401-404 and 406-407 comprise 100 data sets and 500 to 1000 extents, and each has a capacity of 10,000 cylinders. Volume 405 is shown as "Empty", meaning that the data sets thereof have been marked as deleted, for example, in the VTOC for the volume. The source of the "Empty" volume may be the data management of step 260, or the volume may be a "spill" volume which will be discussed.

The data of FIG. 5 illustrates a less active type of data in which the representative volumes 501-503 and 505-507 comprise 100 data sets and 100 to 200 extents, and each has a capacity of 10,000 cylinders. Volume 504 is shown as "Empty", meaning that the data sets thereof have been marked as deleted, for example, in the VTOC for the volume. The source of the "Empty" volume may be the data management of step 260, or the volume may be a "spill" volume which will be discussed.

Referring to FIGS. 2, 3, 4 and 5, in step 325, the freespace module 270 makes use of the information determined in step 315 to determine the freespace threshold.

In one embodiment, the freespace threshold is initially set as a nominal value by the user or is established by a default setting. The nominal value may comprise a value that the user finds from experience to be the value that best fits the needs of the user to conduct defragmentation with the type of data that the user normally has to defrag. As one example, the nominal value needed to conduct defragmentation may comprise 25% freespace within the pool.

In one embodiment, an adjustment is made to the nominal value in accordance with the actual data within the pool. In one embodiment, the adjustment is in accordance with a range based on an index of fragmentation, and, for example, is from 0.5 to 1.5 times the nominal value. If the nominal value is 25%, the adjustment range is (25%)×{0.5 to 1.5}, or a range in value from 12.5% to 37.5%.

In one embodiment, the adjustment in value from the nominal value is based on an index related to the estimated fragmentation. As one example, the index may be from 0 to 1.0 and be added to the bottom of the adjustment range. In one embodiment, the index may be linearly or exponentially related to the estimated fragmentation of the data, or comprise any other non-linear relationship to the estimated fragmentation of the data. In one example, the fragmentation comprises the number of extents minus the number of data sets to provide an estimated number of fragments, and the number of fragments are divided by the capacity of the pool. Thus, the fragmentation value would be a small fraction.

In one embodiment, for the purpose of illustration, using only the representative volumes of FIG. 4, step 315 has determined that, of the volumes having data 401-404 and 406-407 that make up the pool, there are 600 data sets with 4,500 extents. Step 315 has also determined that the capacity of the pool is 70,000 cylinders, if "Empty" volume 405 has been made empty by the data management step 305.

Using the exemplary fragmentation determination above, the number of extents (4,500) minus the number of data sets (600) gives an estimated number of fragments (3,900), and dividing the result by the capacity of the pool (70,000) gives a fragmentation value of (0.0557).

In one embodiment, for the purpose of illustration, using only the representative volumes of FIG. 5, step 315 has determined that, of the volumes having data 501-503 and 505-507 that make up the pool, there are 250 data sets with 900 extents. Step 315 has also determined that the capacity of the pool is 60,000 cylinders, if "Empty" volume 504 does not exist.

Using the exemplary fragmentation determination above, the number of extents (900) minus the number of data sets (250) gives an estimated number of fragments (650), and dividing the result by the capacity of the pool (60,000) gives a fragmentation value of (0.0011).

As discussed above, the index may be linearly or exponentially related to the estimated fragmentation of the data, or comprise any other non-linear relationship to the estimated fragmentation of the data. In one example, the index is linearly related to the estimated fragmentation of the data and ranges from "0" when the fragmentation comprises "0.0000" and "1" when the fragmentation comprises "0.1000".

Using the above examples, the index would comprise (0.56) for the data of the pool of FIG. 4 and (0.01) for the data of the pool of FIG. 5.

In one embodiment, the index value is added to the bottom of the range, comprising (0.56) added to (0.5) for the data of the pool of FIG. 4 to equal (1.06) and comprising (0.01) added to (0.5) for the data of the pool of FIG. 5 to equal (0.51).

The formula to determine the index value is based on the estimated fragmentation of the data of the pool and may vary from that presented above.

In one embodiment, the freespace threshold (T) is determined in accordance with a formula:

$$(T) = (\text{total storage capacity of the pool}) \times (\text{nominal threshold}) \times \{\text{range of 0.5 to 1.5}\}$$

where the value within the range is based on an index of the computed fragmentation.

Using these values to determine the freespace threshold, comprises multiplying the index value times the nominal threshold, and multiplying the resulting percentage times the capacity of the pool. For the data of the pool of FIG. 4, the computation comprises (70,000 cylinders) ×(25 percent) ×(1.06) for a threshold (T) of (18,550 cylinders). For the data of the pool of FIG. 5, the computation comprises (60,000 cylinders)×(25 percent)×(0.51) for a threshold (T) of (7,650 cylinders).

The units of measure to use with the index to establish the threshold (T) of step 325 may vary from that above, with the threshold (T) representing a unit of measure that can be compared to the amount of existing freespace determined in step 320.

Step 330 compares the existing freespace determined in step 320 to the threshold determined in step 325. In step 335, freespace module 270 employs that comparison to determine whether to add "spill" volumes or to order the defragmentation with the existing freespace. If the existing freespace for the pool determined in step 320 is less than the threshold, "spill" volumes are added in step 340. The number of spill volumes added, in one embodiment, is the number required to cause the threshold to be exceeded.

Using the pool of FIG. 5 as an example, with a threshold of (7,650 cylinders), if the freespace determined in step 320 is less than the threshold, only one "spill" volume 504 needs to be added to the pool from the "spill" volumes 290, the added "spill" volume providing 10,000 cylinders. As an alternative, the "spill" volumes may come from an overflow pool of volumes.

Once the freespace, either from the existing freespace or from the combination of the existing freespace with the added "spill" volume(s), exceeds the threshold, the process moves to step 350 of module 280. If "spill" volume(s) are used, the same number of existing volumes are marked as volumes that are to be emptied during the defragmentation process, so that they can be removed from the pool with the defragmentation process completes. The marking may comprise an indication in the VTOC that a volume is to have its contents removed.

The defragmentation module 280 initiates defragmentation, for example by calling a defragmentation process. Some examples comprise "Real Time Defrag" of Dino Software, "Compaktor" of Computer Associates, and "DFDSS Defrag" of International Business Machines Corp. In one embodiment, the defragmentation module additionally allows the user to select options regarding the defragmentation process for the pool. The options comprise selection of objects which are defragmented, and placement of some of the moved data objects in the pool, by the defragmentation process.

The selection of options and parameters may be received from the user and forwarded by the response module 250.

In one embodiment, a "Reduce_Multi" option, if set, indicates that data sets which currently reside on multiple volumes should be allocated on as few volumes as possible. Reasons to select this option may include easier backups, and reduced serialization constraints during some operations. Since striped data sets are set up on purpose for performance reasons, this option would not apply to striped data sets. Since non-striped multi-volume data sets do not stripe the I/O across the volume, the performance implications do not exist for reducing the allocated volumes.

A "Freespace_Preference" option, if set, allows the user to specify how the user want the freespace distributed within the storage pool. For example, it allows a user to specify a minimum amount of freespace to be left one each volume. For example, "Freespace_Preference(5)" means that the user want a minimum 5% freespace left on each volume of the pool. Thus, when allocating data during the defragmentation, no allocation is allowed beyond 95% of the space of a volume. If the user does not have enough space in the pool to meet the specified value after the return of the "spill" volumes, an error message is issued to the user by the response module 250. The total available space in the pool is known after steps 315 and 320 are performed.

An "Empty_Vol_Preference" option allows the user to specify a numeric value representing the minimum number of empty volumes to leave in the pool after the return of the "spill" volumes. These volumes can then be removed after the defragmentation if the user wants to use that space in a different pool, or can be left in the pool to allow for large allocations to a single volume. If the user uses this option, those volumes with the most freespace and the smallest amount of allocated data sets, will have all of the data sets moved off of these volumes during the pool defragmentation. If the user specifies too high of a number of empty volumes in conjunction with the "Freespace_Preference" per volume, then again an error message is issued to indicate insufficient total pool space.

"EAV_Uplift" is an option to move data sets to cylinder-managed storage, as discussed above, if they meet the minimum size criteria. For existing cylinder-managed data sets, they will continue to reside in cylinder-managed storage after the defragmentation, assuming space is still available there. This option also allows the "spill" volumes to be added as Extended Addressable Volumes, discussed above, which will allow for additional EAV space to be available during the defragmentation.

"Retry_in_Use" is a parameter comprising the number of times to retry moving a data set that is currently in use. If the data set is still in use after the maximum number of retries, that data set is not moved.

Step 360 comprises a return from the defragmentation process subsequent to completion of the defragmentation, and step 360 identifies the volumes that are returned to the "spill" volumes. This allows the "spill" volumes to be available for use in another defragmentation.

A person of ordinary skill in the art will appreciate that the embodiments of the present invention, disclosed herein, including the computer-implemented system 200 of FIG. 2 for conducting defragmentation within the system 100 of FIG. 1, and the functionality provided therein, may be embodied as a system, method or computer program product. Accordingly, embodiments of the present invention may take the form of an entirely hardware embodiment, an entirely software embodiment (including firmware, resident software, micro-code, etc.) or a combination thereof, such as an embodiment combining software and hardware aspects that may all generally be referred to herein as a "circuit," "module" or "system." Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those of skill in the art will understand that changes may be made with respect to the methods discussed above, including changes to the ordering of the steps. Further, those of skill in the art will understand that differing specific component arrangements may be employed than those illustrated herein.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A data storage system comprising:
   data storage, wherein data is stored in the form of volumes, at least a plurality of said volumes having freespace, and a grouping of a plurality of volumes comprises a pool; and
   at least one storage control performing the following:
   initiating migration of data from a pool to generate additional freespace;
   subsequent to said migration of data, computing fragmentation of data of said pool;
   determining the amount of existing freespace of said pool;
   comparing said amount of existing freespace to a freespace threshold, said freespace threshold related to said computed fragmentation, wherein said freespace threshold (T) is determined in accordance with a formula:

$$(T) = (\text{total storage capacity of the pool}) \times (\text{nominal threshold}) \times \{\text{range of } 0.5 \text{ to } 1.5\}$$

where the value within said range is based on an index of said computed fragmentation; and
   if said comparison indicates said amount of freespace is below said threshold, adding spill volumes to said pool; and
   else, keeping said pool intact without adding spill volumes; and
   initiating defragmentation of said pool.

2. The data storage system of claim 1, wherein said storage control additionally performs the steps of identifying said spill volumes, if any, as temporary volumes, and, subsequent to said defragmentation of said pool, removing said spill volumes from said pool.

3. The data storage system of claim 1, wherein said freespace threshold comprises a nominal threshold, and said computed fragmentation adjusts said freespace threshold to one of increasing and decreasing said freespace threshold.

4. The data storage system of claim 3, wherein said adjustment comprises a range of values.

5. The data storage system of claim 4, wherein said range of values is adjusted between said values in relation to an index of said computed fragmentation.

6. The data storage system of Claim 5, wherein said index of said computed fragmentation is a value from 0 to 1.0 added to the bottom of said range.

7. The data storage system of claim 6, wherein said computed fragmentation is a ratio of an estimated number of fragments to the data storage capacity of said pool.

8. The data storage system of claim 7, wherein said data comprises volumes having a plurality of data sets, said data sets having at least one data extent each, and wherein said estimated number of fragments is determined from the number of data extents of said pool less the number of data sets of said pool.

9. A computer program product responsive to defragmentation of data of a data storage system, wherein said data is stored in the form of volumes, at least a plurality of said volumes having freespace, and a grouping of a plurality of volumes comprises a pool, said computer program product comprising computer-usable storage medium having non-transient computer-usable program code embodied therein, said computer-usable program code comprising:
   computer-usable program code to initiate migration of data from a pool to generate additional freespace;
   computer-usable program code to, subsequent to said migration of data, compute fragmentation of data of said pool;
   computer-usable program code to determine the amount of existing freespace of said pool;
   computer-usable program code to compare said amount of existing freespace to a freespace threshold, said freespace threshold related to said computed fragmentation, wherein said freespace threshold (T) is determined in accordance with a formula:

$$(T) = (\text{total storage capacity of the pool}) \times (\text{nominal threshold}) \times \{\text{range of } 0.5 \text{ to } 1.5\}$$

where the value within said range is based on an index of said computed fragmentation; and
   if said comparison indicates said amount of freespace is below said threshold, add spill volumes to said pool; and
   else, keep said pool intact without adding spill volumes; and
   computer-usable program code to initiate defragmentation of said pool.

10. The computer program product of claim 9, additionally comprising computer-usable program code to identify said spill volumes, if any, as temporary volumes, and, subsequent to said defragmentation of said pool, remove said spill volumes from said pool.

11. The computer program product of claim 9, wherein said freespace threshold comprises a nominal threshold, and said computed fragmentation adjusts said freespace threshold to one of increasing and decreasing said freespace threshold.

12. The computer program product of claim 11, wherein said adjustment comprises a range of values.

13. The computer program product of claim 12, wherein said range of values is adjusted between said values in relation to an index of said computed fragmentation.

14. The computer program product of Claim 13, wherein said index of said computed fragmentation is a value from 0 to 1.0 added to the bottom of said range.

15. The computer program product of claim 14, wherein said computed fragmentation is a ratio of an estimated number of fragments to the data storage capacity of said pool.

16. The computer program product of claim 15, wherein said data comprises volumes having a plurality of data sets, said data sets having at least one data extent each, and wherein said estimated number of fragments is determined from the number of data extents of said pool less the number of data sets of said pool.

17. In a computer-implemented data storage system comprising at least one storage control and data storage, wherein data is stored in the form of volumes, at least a plurality of said volumes having freespace, and a grouping of a plurality of volumes comprises a pool, the method comprising:
   computing fragmentation of data of said pool;
   determining the amount of existing freespace of said pool;
   comparing said amount of existing freespace to a freespace threshold, said freespace threshold related to said computed fragmentation, wherein said freespace threshold (T) is determined in accordance with a formula:

$(T) = $ (total storage capacity of the pool)×(nominal threshold)×{range of 0.5 to 1.5} where the value within said range is based on an index of said computed fragmentation; and if said comparison indicates said amount of freespace is below said threshold, adding spill volumes to said pool; and else, keeping said pool intact without adding spill volumes; and allowing user selection of an option to move data sets to cylinder-managed storage if they meet the minimum size criteria during defragmentation, and initiating defragmentation of said pool.

* * * * *